(12) United States Patent
Lennartz (10) Patent No.: US 12,513,121 B2
(45) Date of Patent: Dec. 30, 2025

(54) SYSTEM AND METHOD FOR PROVIDING ACCESS TO SECURED CONTENT

(71) Applicant: GENETEC INC., Saint-Laurent (CA)

(72) Inventor: Antoine Lennartz, La Prairie (CA)

(73) Assignee: GENETEC INC., Saint-Laurent (CA)

( * ) Notice: Subject to any disclaimer, the term of this patent is extended or adjusted under 35 U.S.C. 154(b) by 0 days.

(21) Appl. No.: 18/612,582

(22) Filed: Mar. 21, 2024

(65) Prior Publication Data

US 2024/0236049 A1  Jul. 11, 2024

Related U.S. Application Data

(63) Continuation of application No. 17/511,199, filed on Oct. 26, 2021, now Pat. No. 11,962,573.

(51) Int. Cl.
*H04L 29/06* (2006.01)
*H04L 9/32* (2006.01)
*H04L 9/40* (2022.01)

(52) U.S. Cl.
CPC ........ *H04L 63/0421* (2013.01); *H04L 9/3213* (2013.01); *H04L 63/108* (2013.01)

(58) Field of Classification Search
None
See application file for complete search history.

(56) References Cited

U.S. PATENT DOCUMENTS

| | | |
|---|---|---|
| 7,793,095 B2 | 9/2010 | Hardt |
| 8,245,047 B2 | 8/2012 | Zaccone et al. |
| 8,281,149 B2 | 10/2012 | Laurie et al. |
| 8,499,158 B2 | 7/2013 | Lee et al. |
| 8,966,273 B2 | 2/2015 | Hwang et al. |
| 9,407,637 B2 | 8/2016 | Patey et al. |
| 9,628,282 B2 | 4/2017 | Khalil et al. |
| 9,792,426 B1 | 10/2017 | Driscoll et al. |
| 10,366,250 B1 | 7/2019 | Chen et al. |
| 11,223,616 B2 * | 1/2022 | Grødum ............. H04L 63/0823 |
| 2006/0155993 A1 | 7/2006 | Busboon |

(Continued)

FOREIGN PATENT DOCUMENTS

| | | |
|---|---|---|
| CN | 109495426 | 3/2019 |
| CN | 110287726 | 9/2019 |
| WO | 2021036292 | 3/2021 |

*Primary Examiner* — Jeffery L Williams
(74) *Attorney, Agent, or Firm* — NORTON ROSE FULBRIGHT CANADA LLP (57) ABSTRACT

A method may include obtaining, from a requesting entity system, a request to access secured content stored at a provisioning entity system, the request comprising user identifying data associated with a user of the requesting entity system, determining a user ID usable to identify the user with the requesting entity system without being usable to identify the user with the provisioning entity system, generating a trusted token for use in accessing the secured content, comprising generating a variable term different from other variable terms generated for other requests, incorporating the variable term in the trusted token, omitting remaining user identifying information present in the request from the trusted token, and incorporating a proof of authentication in the trusted token to enable the provisioning entity system to validate the trusted token, and transmitting the trusted token to the requesting entity system for use by the user in accessing the secured content.

26 Claims, 5 Drawing Sheets

(56) References Cited

U.S. PATENT DOCUMENTS

| | | | |
|---|---|---|---|
| 2007/0274489 A1 | 11/2007 | Yamamura et al. | |
| 2009/0119763 A1 | 5/2009 | Park et al. | |
| 2009/0165098 A1 | 6/2009 | Ifrah | |
| 2010/0174911 A1 | 7/2010 | Isshiki | |
| 2010/0274634 A1 | 10/2010 | Ifrah | |
| 2010/0325441 A1* | 12/2010 | Laurie | H04L 9/3257 713/185 |
| 2012/0265997 A1* | 10/2012 | Laurie | H04L 9/3213 713/185 |
| 2016/0142409 A1 | 5/2016 | Frei et al. | |
| 2017/0186123 A1* | 6/2017 | Shelton | G06Q 50/265 |
| 2023/0401330 A1* | 12/2023 | Anderson | G06F 21/6218 |
| 2024/0236049 A1* | 7/2024 | Lennartz | H04L 63/0807 |

* cited by examiner

SYSTEM AND METHOD FOR PROVIDING ACCESS TO SECURED CONTENT

CROSS-REFERENCE TO RELATED APPLICATIONS

This patent application is a continuation of U.S. application Ser. No. 17/511,199 filed Oct. 26, 2021, the entire contents of which are incorporated herein by reference.

FIELD

The present disclosure generally relates to the field of online security.

BACKGROUND

Organizations and their respective information technology and data systems often share information with each other. In a multi-tenanted system, it is desirable to facilitate sharing of data across multiple organizations that are tenants. Each organization may have its own users and associated user account information, which may be private and proprietary. In addition, some user information may be restricted by law and regulations from being shared across multiple organizations.

Secured content owned by one of the organizations may be only allowed access when the user requesting access is authenticated. When an external user is requesting access to said secured content, it is desirable to authenticate the external user without having to comprise the privacy of the user, while still providing an audit trail.

SUMMARY

In accordance with an aspect, there is provided a computer-implemented method for providing access to secured content on a provisioning entity system for a user of a requesting entity system. The method comprises obtaining, from the requesting entity system, a request to access the secured content stored at the provisioning entity system, the request comprising user identifying data associated with the user, determining, for the request, a user ID associated with the user, the user ID usable to identify the user with the requesting entity system without being usable to identify the user with the provisioning entity system, and generating, using the request, a trusted token for use in accessing the secured content. Generating the trusted token comprises generating a variable term based on the user ID, the variable term being different from a plurality of other variable terms generated for a plurality of other requests to access the secured content, incorporating the variable term in the trusted token, omitting remaining user identifying information present in the request from the trusted token, and incorporating a proof of authentication in the trusted token to enable the provisioning entity system to validate the trusted token. The method also comprises transmitting the trusted token to the requesting entity system for use by the user in accessing the secured content.

In some embodiments, the variable term is uniquely generated for each request issued by the requesting entity system.

In some embodiments, generating the variable term based on the user ID comprises encrypting the user ID.

In some embodiments, generating the variable term based on the user ID comprises combining the user ID and an additional term to produce an intermediary term, and encrypting at least part of the intermediary term.

In some embodiments, the user ID is obtained from the request and forms part of the user identifying data.

In some embodiments, the user identifying data comprises at least one of: a name, a phone number, a physical address, an e-mail address, a media access control (MAC) address, and an IP address associated with the user.

In some embodiments, the trusted token comprises data representing an expiry period of the trusted token.

In some embodiments, the trusted token comprises an indication of a scope of the secured content identified in the request.

In some embodiments, incorporating the proof of authentication in the trusted token comprises incorporating a digital signature produced by a platform trusted by the provisioning entity system.

In some embodiments, the platform trusted by the provisioning entity generates the trusted token.

In some embodiments, the method further comprises, subsequent to the secured content being accessed by the user using the trusted token, receiving an auditing request comprising at least one user ID from the requesting entity system, obtaining at least one validated trusted token used to access the secured content at the provisioning entity system, identifying, based on the at least one validated trusted token, one or more accessing user IDs from the at least one user IDs, the one or more accessing user IDs associated with one or more respective validated trusted tokens used to access the secured content at the provisioning entity system, and transmitting the one or more accessing user IDs to the requesting entity system in response to the auditing request.

In some embodiments, the auditing request identifies a given time period, and wherein identifying the one or more accessing user IDs comprises identifying validated trusted token used to access the secured content at the provisioning entity system during the given time period.

In some embodiments, identifying the one or more accessing user IDs comprises decrypting the at least one validated trusted token to obtain, for each of the at least one validated trusted token, a respective user ID from the one or more user IDs.

In some embodiments, the method comprises, for each of the at least one validated trusted tokens, parsing a respective intermediary term obtained from the decrypting to obtain the respective user ID.

In accordance with another aspect, there is provided a computer-implemented system for providing access to secured content on a provisioning entity system for a user of a requesting entity system. The system comprises a communication interface, at least one processor, memory in communication with said at least one processor, and instructions stored in said memory, which when executed at said at least one processor causes said system to perform obtaining, from the requesting entity system, a request to access the secured content stored at the provisioning entity system, the request comprising user identifying data associated with the user, determining, for the request, a user ID associated with the user, the user ID usable to identify the user with the requesting entity system without being usable to identify the user with the provisioning entity system, generating, using the request, a trusted token for use in accessing the secured content, comprising generating a variable term based on the user ID, the variable term being different from a plurality of other variable terms generated for a plurality of other requests to access the secured content, incorporating the variable term in the trusted token, omitting remaining user identifying information present in the request from the trusted token, and incorporating a proof of authentication in the trusted token to enable the provisioning entity system to validate the trusted token, and transmitting the trusted token to the requesting entity system for use by the user in accessing the secured content.

In some embodiments, generating the variable term based on the user ID comprises encrypting the user ID.

In some embodiments, the user ID is obtained from the request and forms part of the user identifying data.

In some embodiments, incorporating the proof of authentication in the trusted token comprises incorporating a digital signature produced by a platform trusted by the provisioning entity system.

In some embodiments, the instructions when executed at said at least one processor, further cause said system to perform, subsequent to the secured content being accessed by the user using the trusted token: obtaining an auditing request comprising at least one user ID from the requesting entity system, obtaining at least one validated trusted token used to access the secured content at the provisioning entity system, identifying, based on the at least one validated trusted token, one or more accessing user IDs from the at least one user IDs, the one or more accessing user IDs associated with one or more respective validated trusted tokens used to access the secured content at the provisioning entity system, and transmitting the one or more accessing user IDs to the requesting entity system in response to the auditing request.

In some embodiments, the auditing request identifies a given time period, and wherein identifying the one or more accessing user IDs comprises identifying validated trusted token used to access the secured content at the provisioning entity system during the given time period.

In some embodiments, identifying the one or more accessing user IDs comprises decrypting the at least one validated trusted token to obtain, for each of the at least one validated trusted token, a respective user ID from the one or more user IDs.

In accordance with yet another aspect, there is provided a non-transitory computer-readable storage medium storing instructions which, when executed, cause at least one computing device to perform obtaining, from the requesting entity system, a request to access the secured content stored at the provisioning entity system, the request comprising user identifying data associated with the user, determining, for the request, a user ID associated with the user, the user ID usable to identify the user with the requesting entity system without being usable to identify the user with the provisioning entity system, generating, using the request, a trusted token for use in accessing the secured content, comprising generating a variable term based on the user ID, the variable term being different from a plurality of other variable terms generated for a plurality of other requests to access the secured content, incorporating the variable term in the trusted token, omitting remaining user identifying information present in the request from the trusted token, and incorporating a proof of authentication in the trusted token to enable the provisioning entity system to validate the trusted token, and transmitting the trusted token to the requesting entity system for use by the user in accessing the secured content.

Other features will become apparent from the drawings in conjunction with the following description.

BRIEF DESCRIPTION OF DRAWINGS

In the figures which illustrate example embodiments.

DETAILED DESCRIPTION

Secured content owned by an organization may be accessed by an external user when the user requesting the secured content is properly authenticated. The organization may need a number of different types of information for proper authentication. However, the user requesting access to the secured content may wish to protect his or her own privacy and identity. For example, a retail store may grant access to its video surveillance system to the local police department upon a proper cause (e.g., potential crime investigation), but the police department may wish to protect the identity of its police officier(s) accessing the secured content (e.g., videos) in the video surveillance system.

A service provider or authenticating system that facilitates the secure access of secured content owned by a provisioning entity system (e.g., the retail store) to one or more users of a requesting entity system (e.g., the police department) may desire to facilitate the secured access while minimising both cost and liability. For instance, when a user is requesting access to said secured content, it is desirable to authenticate the external user without having to comprise the privacy of the user, while still providing an audit trail.

Currently, computer systems which store and manage access to data often keep records (e.g., logs) of data access for audit purposes. Authentication is often performed in a dedicated environment, including for example single sign-on (SSO) and centralized identity and access management (IAM). Example IAM platforms include Azure AD, Okta, Ping, Auth0, and so on. However, for separate and distinct enterprises and organizations, such as in the above example of retail store and police department, SSO and IAM can be difficult and costly to implement.

In some instances, if the requesting entity system makes a copy of and transmits the user data to the provisioning entity system, across multiple organizations and systems, the users who sign on through the requesting entity system may risk losing certain levels of privacy. From a privacy perspective, it is important for the users to be anonymous and not identifiable, and further not correlatable based on user activities or other indicators such as MAC address, IP address, and so on.

On the other hand, if a blanket permission is given from the provisioning entity system to the requesting entity system for data access, such as using a system-level account without specific user information, the provisioning entity system may lose visibility on content access, and it would be difficult to determine exactly which user(s) have accessed which content using audit trails.

Figure 1:
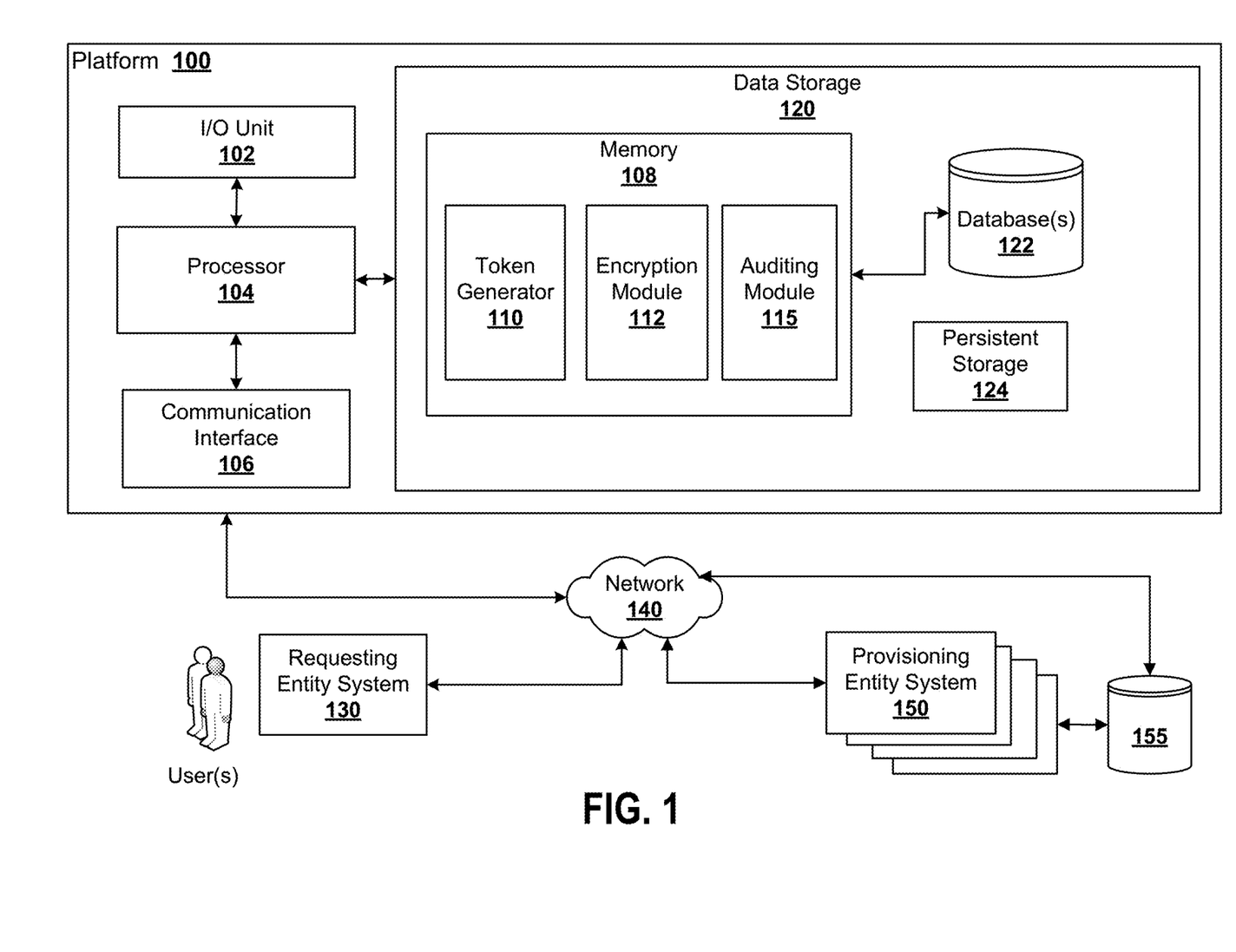
FIG. 1 is an example schematic diagram of a platform for providing access to secured content on a provisioning entity system, in accordance with an embodiment.

The example embodiments described herein, including platform 100 in FIG. 1, provides a technical solution configured to provide access to one or more secured content of a provisioning entity system, where user account information may be used to authenticate the user request and hidden from the provisoning entity system. The present disclosure provides non-correlation of actions performed by users between different login sessions at the requesting entity system, either through the same application interface (e.g., mobile application) or different application interface (e.g., web browser interface). The technical solution further provides the ability to reconstruct an accurate and precise activity log for audits of content access without compromising any user account information.

FIG. 1 is a high-level schematic diagram of an example computer-implemented platform 100 for providing access to secured content on a provisioning entity system 150, exemplary of embodiments.

As detailed herein, in some embodiments, platform 100 includes features adapting it to perform certain specialized purposes, e.g., as a authetication platform to authenticate user requests from a requesting entity system 130 for access to secured content on a separate system (e.g., provisioning entity system 150) and to provide trusted tokens in response to the user requests.

Referring now to the embodiment depicted in FIG. 1, platform 100 can include an I/O unit 102, a processor 104, communication interface 106, and data storage 120. The I/O unit 102 can enable platform 100 to interconnect with one or more input devices, such as a keyboard, mouse, camera, touch screen and a microphone, and/or with one or more output devices such as a display screen and a speaker.

Platform 100 can connect to a requesting entity system 130 to receive input data such as user requests for accessing one or more secured content on a remote system, which may be, for example, the provisioning entity system 150. A real world example of the requesting entity system 130 may be a system maintained by or associated with the local police department, and a real world example of the provisioning entity system 150 may be a system maintained by or associated with a retail store. The secured content may be videos or other media captured by a surveillance system installed throughout the retail store.

In some embodiments, platform 100 is an independent system that acts as an authentication authority, which can receive user requests from the requesting entity system 130, and facilitate access to one or more secured content 155 stored on the provisioning entity system 150 based on authentication of the received user requests. In some embodiments, some or all of the secured content 155 owned by the provisioning entity system 150 may be stored on one or more databases, which in certain circumstances may reside in servers managed by the same entity which manages the platform 100. In some other embodiments, the servers in which the secured content 155 resides may be managed by a party separate from that which manages the platform 100.

Platform 100 can be operable to register and authenticate users (using a login, unique identifier, and password for example) prior to providing access to applications, a local network, network resources, other networks and network security devices.

In some embodiments, authentication performed by platform 100 may be claims-based authentication where an identity ascertained from a user request is defined as a set of claims (e.g., key value pairs), and a proof of identity is translated to a token containing these claims. The token may be cryptographically signed by a trusted authority such as platform 100, and may be referred to as a trusted token. The provisioning entity system 150 may receive the trusted token and verify that it is legimatically issued by platform 100, then grant user access to the requested secure content 155.

Network 140 (or multiple networks) is capable of carrying data and can involve wired connections, wireless connections, or a combination thereof. Network 140 may involve different network communication technologies, standards and protocols, for example.

The requesting entity system 130 interacts with platform 100 and the provisioning entity system 150 to exchange data (including user commands) and, through an interface application, generates visual elements for display at a user device. The visual elements can represent elements configured to receive user commands for a user request for one or more secured content 155 at the provisioning entity system 150, when appropriate. For example, when a user wishes to request access to secured content 155 at the provisioning entity system 150, the requesting entity system 130 may obtain a set of user information based on the account with which the user is currently logged in. The user information may include, for example, name, job title, a reason for the access request, e-mail address, phone number, work address, home address, and so on. These user information may be considered private by the user, because they may be identifying of the user themselves, that is to say, revealing of their identity.

Memory 108 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Data storage devices 120 can include memory 108, databases 122, and persistent storage 124.

The processor 104 can execute instructions in memory 108 to implement aspects of processes described herein. The processor 104 can execute instructions in memory 108 to configure a token generator 110, an encryption module 112, an auditing module 115, and other functions described herein. The processor 104 can be, for example, any type of general-purpose microprocessor or microcontroller, a digital signal processing (DSP) processor, an integrated circuit, a field programmable gate array (FPGA), a reconfigurable processor, or any combination thereof.

The token generator 110 can be configured to generate and sign a trusted token based on an individual user request from the requesting entity system 130. The user request may include one or more data items, including but not limited to: a timestamp, a domain identifier or system ID, a user ID, one or more user identifying information, and one or more content identifying information. The timestamp may indicate a time and date for when the user request is generated by the requesting entity system 130. The domain identifier or system ID may indicate the requesting entity system 130. The user ID may be an identifier associated with the requesting entity system 130, or with the user associated with the user request provided to the platform 100. In some embodiments, the user ID may be a so-called "stable ID", which is uniquely associated with the user, but not directly identifying thereof.

The user identifying information may include data representing at least one of: a name, a phone number, a physical address, an e-mail address, a media access control (MAC)

address and/or an IP address of the device used to log into the requesting entity system 130, and so on.

In some embodiments, the user request from the requesting entity system 130 may not include any specific user identifying information, as the requesting entity system 130 may be implemented to specifically shield any user identifying information from platform 100. The user request from the requesting entity system 130 may still include other information such as described herein.

The content identifying information may include data representing at least one of: a provisioning entity system, a URL of the provisioning entity system, a type (e.g., video, audio, image or document) of the content being requested, specific identifiers of the content being requested, a URL of each content being requested, and so on.

The token generator 110 may be configured to first remove one or more data items from the user request prior to generating a token based on the user request. For example, some or all of the user identifying information present in the user request may be removed in order to improve the anonymity of user as represented in the trusted token to be produced based on the user request. Next, the token generator 110 can determine the user ID based on the user request. The user ID is typically associated with a particular user from the requesting entity system 130 without directly identifying them, and may be a string of numbers, alphabets, symbols or any combination thereof. Put differently, the user ID may not on its own be used by a third party to identify the user. However, the user ID may be uniquely associated with the user, and can be used by the requesting entity system 130, to identify the specific user logged into the requesting entity system 130 when making the user request.

In some embodiments, platform 100 is configured to delete the user identifying information from all temporary and persistent data storage devices of the platform 100, without permanently storing any of the user identifying information from any user request. In other embodiments, platform 100 may store part or all of the user identifying information in a secured database, in order to help with reconstruction of audit records without involvement of the requesting entity system 130.

The token generator 110 can use the user ID and domain identifier, as well as other information from the user request to verify that the user request indeed has come from the specific requesting entity system 130, and proceeds to issue a trusted token having at least one claim representing that the user sending the user request is a user or member of the requesting entity system 130.

The token generator 110 can be configured to generate a variable term (also known as a pseudo-term) to be included in each trusted token based on the user ID from the user request, in order to prevent the user ID from being disclosed to other systems, including the provisioning entity system 150. The token generator 110 can be configured to ensure that the respective variable term generated for the respective trusted token for each user request received by the platform 100 is uniquely generated. In some embodiments, the uniqueness of each variable term for each user request may be enforced during a specific time frame (e.g., in the past three months, the past six months, or in the past year). The uniquness of the variable term and thus of the trusted token helps to ensure that the provisioning entity system 150 cannot correlate activities of any specific user over time, as such correlation could lead to a deduction of the user's identity.

In some embodiments, the token generator 110 can be configured to ensure that the respective variable term for each user request is unique among all the user requests associated with a specific provisioning entity system 150.

For example, the token generator 110 can be configured to generate a variable term by encrypting the user ID from the respective user request associated with the trusted token. The encryption process may add (concatenate) a random, pseudo-random, arbitrary, or predetermined term to the user ID, or may change the user ID in a similar fashion, to generate the variable term. The encryption may be performed by the encryption module 112. In some embodiments, including embodiments in which the trusted token is used in a claims-based authentication environment, the trusted token may be structured such that the variable term acts as the claim indicating the identity of the user making the user request. In this fashion, the trusted token may be generated such that the variable term replaces the user ID, which would typically act as the claim indicating the identity of the user. Thus, the user ID itself may be absent from the trusted token, or included in a fashion which is not recoverable by the provisioning entity system 150, having been replaced by the variable term.

In some embodiments, the variable term may change over time, per hour, per day, per week, or per any other given period of time. For instance, the term concatenated to the user ID may be varied over time.

In some embodiments, the variable term may include a timestamp generated based on the timestamp included in the user request, or a timestamp generated based on a clock time of platform 100. For instance, the term concatenated to the user ID may be a timestamp of the user request, a timestamp at which the platform 100 processes the user request, or the like.

In some embodiments, the variable term may include a predetermined value, which may be, for example, a login count (e.g., this is the $n^{th}$ login from XYZ requesting entity system 130 today), or a timestamp at the time of token generation. For instance, the term concatenated to the user ID may a count of user requests or login attempts performed by the user using the user ID.

In some embodiments, the token generator 110 may be configured to include the user ID from the user request in the trusted token without randomizing or encrypting it. This way, the provisioning entity system 150 may be able to correlate user activities (e.g., multiple user requests for secured content) based on the received trusted tokens sent by the same user from the requesting entity system 130. This may harm privacy of the users of the requesting entity system 130, but may allow the provisioning entity system 150 to perform audits with the requesting entity system 130, and without the involvement of platform 100.

The token generator 110 may include other data in the trusted token, such as for example, one or more of: a type or scope of secure content being requested, specific URLs of the secure content being requested, a domain identifier identifying the requesting entity system 130 (but nothing identifying the specific user of the system 130), an expiry date and time of the trusted token, and so on.

The token generator 110 can be configured to add a proof of authentication to the trusted token to allow the provisioning entity system 150 to validate the trusted token. For example, this can be the digital signature, which can be generated using a private key belonging to platform 100, and verifiable with a corresponding public key provided by platform 100 to the provisioning entity system 150. This way, when the provisioning entity system 150 receives the trusted token, it can use the public key corresponding to the private key to validate that the trusted token is generated by platform 100, before granting access to the secured content to the user.

In some embodiments, the public key(s) corresponding to the private key used to add the digital signature to the trusted token may be stored in a database accessible by the public, including the provisioning entity system 150. The public keys may be managed by platform 100 and updated from time to time. The trusted token in some embodiments may include a URL for obtaining the corresponding the public key. In some embodiments, the provisioning entity system may obtain the relevant public key from the URL included in the trusted token. In some other embodiments, the provisioning entity may compare the URL included in the trusted token to a whitelist or other listing of approved URLs, and accept or reject the trusted token based on whether the URL included in the trusted token is also present in the whitelist.

The encryption module 112 can be configured to perform an encryption process, as appropriate, when called by components of platform 100, such as the token generator 110. For instance, the encryption module 112 can perform encryption of part of the trusted token (e.g., the variable term), or of the entire trusted token. The encryption may be performed with a random or pseudo-random encryption key generated by an algorithm, or in any other suitable fashion. For example, the variable term may be generated by hashing and encrypting the user ID from a user request.

When performed on the entire trusted token, the encryption may be decrypted, in some embodiments, with the appropriate key by the provisioning entity system 150. The encryption process may be done with symmetric key schemes, or public key schemes (e.g., RSA).

The auditing module 115 can be configured to perform an auditing process based on a request received by platform 100, with collaboration from one or more systems such as the requesting entity system 130 and the provisioning entity system 150. For example, when platform 100 receives an auditing request, the auditing request may include a plurality of user IDs from an outside system such as the requesting entity system 130. The auditing request also can include other information such as a domain identifier identifying the specific requesting entity system 130, a provisioning entity system identifier of the provisioning entity system 150, and optionally a time period during which some of the user IDs may be used to request secured content at the provisioning entity system 150.

The auditing module 115 is configured to obtain a plurality of validated trusted tokens used to access one or more secured content 155 at the provisioning entity system 150. In some embodiments, when a time period is given within the auditing request, the plurality of validated trusted tokens may be limited to those used to access content at the provisioning entity system 150 during the given time period. In other embodiments, when a time period is not specified by the auditing request, the time period may be assumed to be within any suitable past duration, e.g., the past week, the past month, the past year, since the inception of the provisioning entity system 150, or since the inception of the provisioning of access to the provisioning entity system 150 for users of the requesting entity system 130, and so on.

The auditing module 115 may then be configured to determine, based on the plurality of validated trusted tokens, one or more user IDs from the plurality of user IDs, the one or more user IDs used to access the one or more secured content at the provisioning entity system.

In some embodiments, the auditing module 115 may determine the one or more user IDs by decrypting the plurality of validated trusted tokens to obtain, for each of the plurality of validated trusted tokens, an intermediary term. The intermediary term may include one or more of: a respective user ID from the one or more user IDs and/or a respective variable term. The auditing module 115 may parse each intermediary term to obtain the respective user ID.

For example, in the case where the respective user ID has been previously encrypted by the encryption module 112 to become a variable term, the auditing module 115 may decrypt the intermediary term to obtain the respective user ID.

For another example, in the case where the respective user ID was concatenated by a random or pseudo-random term to become a variable term, the auditing module 115 may parse the intermediary term to obtain the respective user ID.

The auditing module 115 may then transmit the determined one or more user IDs to the requesting entity system 130 in response to the auditing request. Additionally, the auditing module 115 can provide information about the elements of the secured content 155 that were accessed by each of the user IDs, about the patterns of access (time, frequency, etc.), or other relevant information.

Referring back to FIG. 1, the communication interface 106 can enable platform 100 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

The data storage 120 may be configured to store information associated with or created by the components in memory 108 and may also include machine executable instructions. The data storage 120 includes a persistent storage 124 which may involve various types of storage technologies, such as solid state drives, hard disk drives, flash memory, and may be stored in various formats, such as relational databases, non-relational databases, flat files, spreadsheets, extended markup files, etc.

Figure 2A:
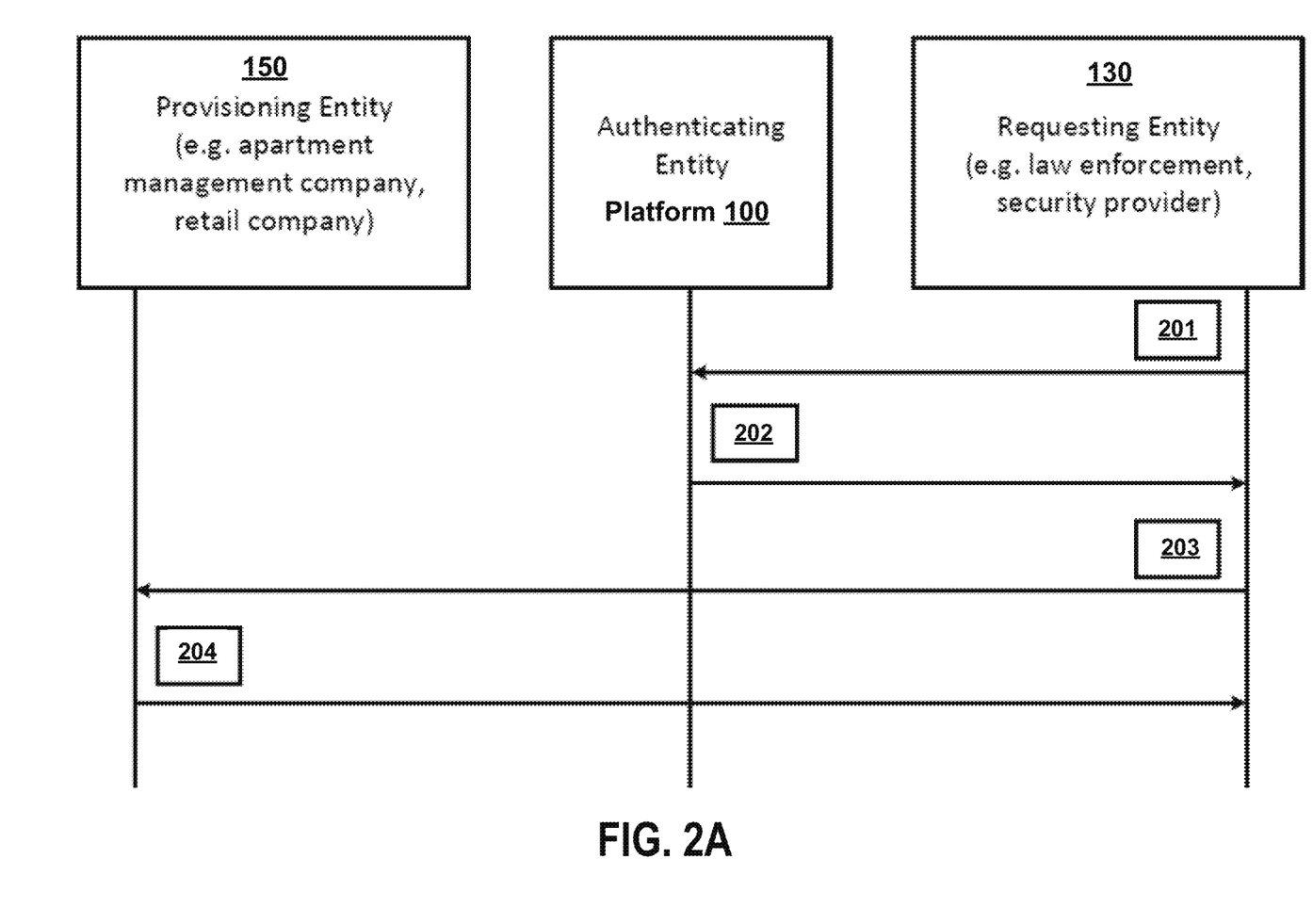
FIG. 2A is an example schematic flow chart between the systems shown in FIG. 1, in accordance with an embodiment.

FIG. 2A is an example schematic flow chart between the systems shown in FIG. 1, in accordance with an embodiment.

At step 201, the requesting entity system 130 may request a token from an authenticating system (e.g., platform 100), which a user of the requesting entity system 130 can use to access resources such as secured content at the provisioning entity system 150. The user may submit a user request for the secured content, the user request including at least a user ID and may optionally include certain types of user identifying information. The user ID may be referred to as a stable identifier, which allows platform 100 to correlate back to the original user request, but does not directly link back to the user himself without collaboration of the requesting entity system 130.

At step 202, platform 100 generates a digitally-signed trusted token through the token generator 110, and transmits the trusted token to the requesting entity system 130. The digital signature allows the provisioning entity system 150 to confirm that the platform 100 has issued the trusted token, thereby allowing the provisioning entity system 150 to trust the token. To prevent the provisioning entity system 150 from being able to identify or correlate the user based on the trusted token, platform 100 may first remove all the user identifying information from the user request (if any), and generate a variable term based on the user ID in accordance with processes described above performed by the token generator 110. The variable term may be encrypted by the encryption module 112.

The token generator 110 may include other data in the trusted token, such as for example, one or more of: a type or scope of secure content being requested, specific URLs of the secure content being requested, a domain identifier identifying the requesting entity system 130 (but nothing identifying the specific user of the system 130), an expiry date and time of the trusted token, and so on.

The token generator 110 can be configured to add a proof of authentication to the trusted token to allow the provisioning entity system 150 to validate the trusted token. For example, this can be the digital signature, which can be generated using a private key belonging to platform 100, and verifiable with a corresponding public key provided by platform 100 to the provisioning entity system 150. This way, when the provisioning entity system 150 receives the trusted token, it can use the public key corresponding to the private key to validate that the trusted token is generated by platform 100, before granting access to the secured content to the user.

In some embodiments, the corresponding public key(s) to the private key used to add the digital signature to the trusted token may be stored in a database accessible by the public, including the provisioning entity system 150. The public keys may be managed by platform 100 and updated from time to time. The trusted token may include a URL for obtaining the corresponding the public key.

At step 203, the user, through an application or interface of the requesting entity system 130, sends a request to the provisioning entity system 150 using the trusted token in order to access content at the provisioning entity system 150. The provisioning entity system 150 may first verify, using for example a public key corresponding to the private key used to sign the trusted token by platform 100, that the trusted token has been issued by platform 100, a trusted authentication system.

At step 204, the provisioning entity system 150 may decrypt, if necessary (e.g., if the trusted token has been encrypted by platform 100), the trusted token to determine information such as the identity of the requesting entity system 130 using a domain identifier included in the trusted token. If the requested content can be shared with members of the requesting entity system 130, the provisioning entity system 150 can facilitate the access to the requested content, and log the access event with part or all of the trusted token, which can be used in the auditing process later. For instance, the access event may be logged with the claims of the trusted token, including the claim indicating the identity of the user making the request using the trusted token. In some embodiments, the requested content may be specified within the trusted token. In some embodiments, the requested content may be specified within the request sending the trusted token.

The record or log of the access event by the provisioning entity system 150 may include information such as date and time of access, the trusted token in encrypted and/or decrypted form, the domain identifier linked to the requesting entity system 130, and the exact files accessed.

An auditing process can be instantiated by either the provisioning entity system 150, which may detect multiple access events to a particular content or multiple access events at similar times or within a set time frame, or by the requesting entity system 130, which may detect that a given user has made multiple requests to the provisioning entity system 150 without knowing what was accessed. When the requesting entity system 130 sends an auditing request, the auditing request may include user IDs that may have been used to access content at the provisioning entity system 150. The auditing request may include a specific time period for when the user IDs may have been used to access the content at the provisioning entity system 150. In some embodiments, the auditing request may include all the user IDs of the requesting entity system 130.

Based on the auditing request, platform 100 may request information from the provisioning entity system 150, which can then provide records or logs of what content was accessed and what trusted tokens were used to access the content (which, by themselves, are not identifying or correlatable). In some embodiments, the logs may include all the trusted tokens used to access content from the specific requesting entity system 130 during a specific time period, which may be included in the auditing request, or an assumed time period (e.g., the past week, the past month, or the past year).

Platform 100 may then process each of the the trusted tokens to determine the user ID within each trusted token. Once all the user IDs in the trusted tokens are identified, the user IDs can be sent to the requesting entity system 130, which can identifier particular users based on the user IDs.

In some embodiments, platform 100 may based on its own record, determine which user IDs are used to request access for content at a provisioning entity system 150 during a specific time period. For example, platform 100 may store all the trusted tokens generated and the associated user IDs in a local database. Upon receiving an auditing request from either the requesting entity system 130 or the provisioning entity system 150, platform 100 may determine, based on the stored trusted tokens which user IDs have been used to request content at the provisioning entity system 150 during a specific time period. The list of user IDs may be sent to the requesting entity system 130 for identifying the specific users behind the trusted tokens and user requests.

The implementations described above allow the provisioning entity system 150 to be assured of the validity of a request without revealing identifying information about the user at the requesting entity system 130. The implementations also facilitate audit of file accesses which may require collaboration of two or three entities to determine which user(s) performed the access to one or more secured content at the provisioning entity system 150.

Figure 2B:
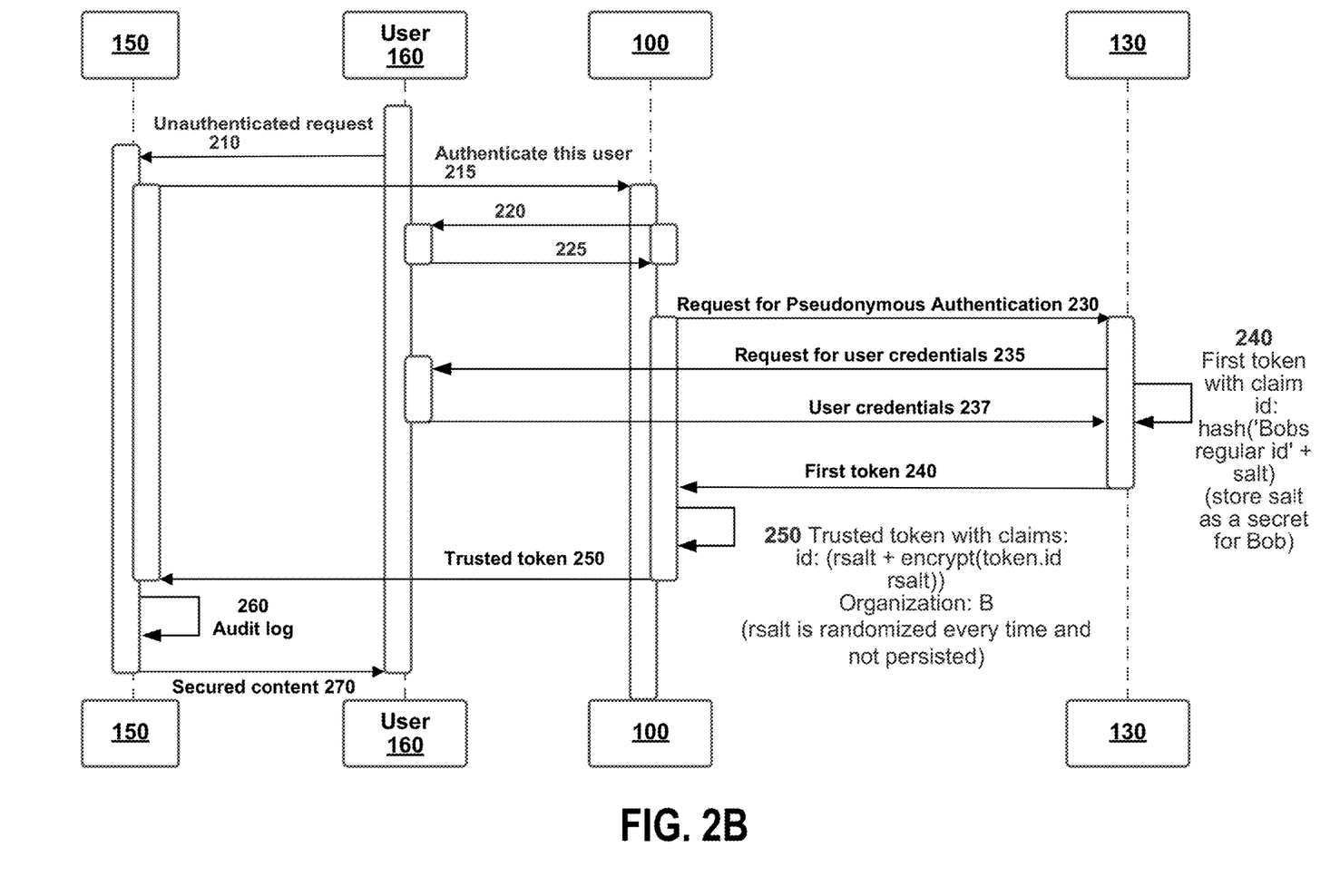
FIG. 2B is annother example schematic flow chart between the systems shown in FIG. 1, in accordance with an embodiment.

FIG. 2B is another example schematic flow chart between the systems shown in FIG. 1, in accordance with an embodiment. A user device 160 of a user of the requesting entity system 130 may send an unauthenticated request 210 to the provisioning entity system 150 requesting access to one or more secured content stored at the provisioning entity system 150. The user may request access to a particular file, or to a particular group of files (e.g., video files on date X for location Y). The user device 160 may be, for example, a computer or a mobile device.

The provisioning entity system 150 may send a request 215 to platform 100 to authenticate the user account associated with user device 160. Platform 100 may send an query 220 to the user device 160 requesting the user to indicate if the user is a member of a requesting entity system 130, and the response 225 from the user device 160 may indicate that the user is a member of requesting entity system 130 (e.g., "Organization B"). Next, platform 100 may send a request 230 to the requesting entity system 130 to perform a pseudonymous authentication of the user account associated with user device 160.

The requesting entity system 130 may then send a request 235 to the user device 160 requesting user credentials, and the user may send back requested credentials 237 to the requesting entity system 130. Based on the user credentials 237, the requesting entity system 130 may generate a first token 240 with at least a user ID (e.g., "Bob ID") associated with the user account used to send the user credentials 237. The first token 240 may include an encrypted form of the user ID (e.g., a hash of ["Bob ID"+salt]). The first token 240 may be signed with a digital signature by the requesting entity system 130.

Next the requesting entity system 130 may send the signed first token 240 to platform 100, which may first verify that the signed first token 240 is legitimate, by for example verifying the digital signature with a public key. Once platform 100 has authenticated the first token 240 to come from the requesting entity system 130, it may obtain a intermediary ID from the first token 240. In some embodiments, the intermediary ID may be the user ID in the first token 240. In other embodiments, the intermediary ID may be the encrypted or hashed form of the user ID in the first token 240.

Platform 100 may next generate a trusted token 250 with the stable ID, for example, it may add a random or pseudo-random term "rsalt" to the stable ID, and then encrypt "stable ID+rsalt" with an encryption scheme. The random or pseudo-random term "rsalt" can be uniquely generated for each user request or first token 240 received by platform 100, even if multiple user requests came from the same user device 160.

The trusted token 250 may further include a domain identifier identifying the requesting entity system 130 (e.g., "Organization B"). The trusted token 250 may include other information such as a timestamp, an expiry date, a scope of content being requested, and so on. The trusted token 250 may be digitally signed by using a private key owned by platform 100 and sent to the provisioning entity system 150. The trusted token 250 may be encrypted before digitally signed.

The provisioning entity system 150 may first verify, using for example a public key corresponding to the private key used to sign the trusted token 250 by platform 100, that the trusted token 250 has been issued by platform 100, a trusted authentication system.

The provisioning entity system 150 may decrypt, if necessary (e.g., if the trusted token 250 has been encrypted by platform 100), the trusted token 250 to determine information such as the identity of the requesting entity system 130 using a domain identifier included in the trusted token. If the requested content can be shared with members of the requesting entity system 130, the provisioning entity system 150 can facilitate the access to the requested content 270, and store the access event with the trusted token in an record or log 260, which can be used in the auditing process later.

The record or log 260 of the access event by the provisioning entity system 150 may include information such as date and time of access, the trusted token in encrypted and/or decrypted form, the domain identifier linked to the requesting entity system 130, and the exact secured content 270 accessed, which is then provided by the provisioning entity system 150 to the user device 160.

Figure 3:
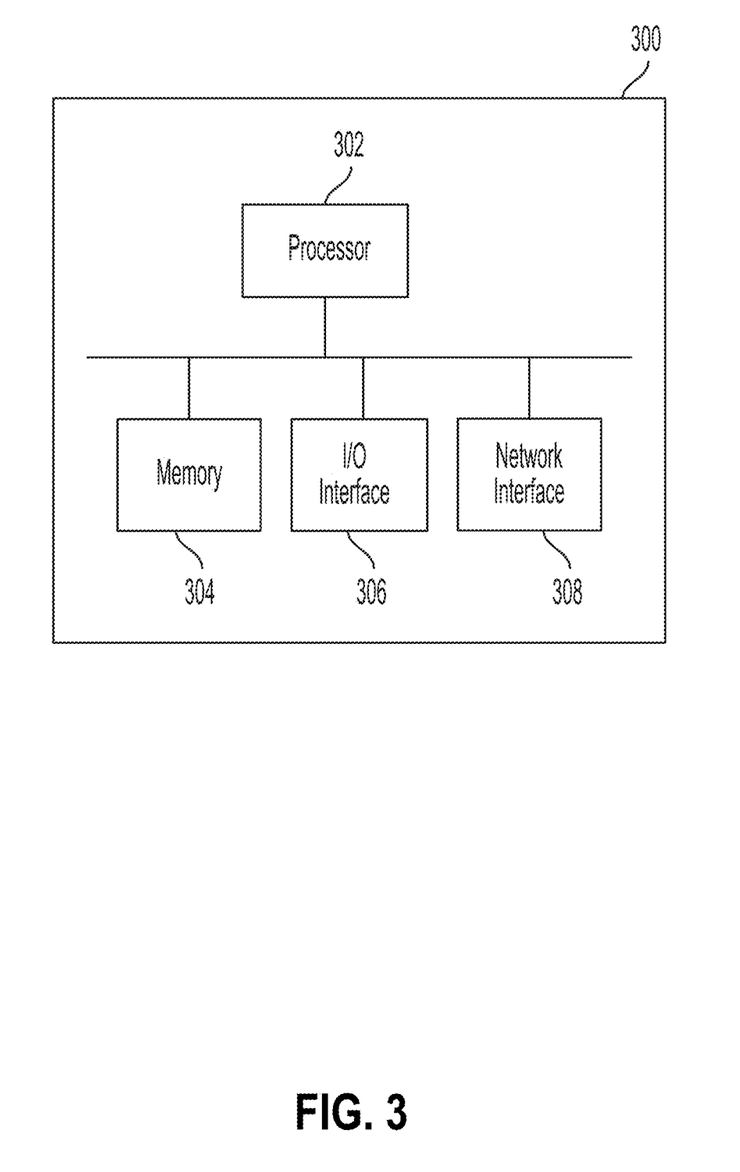
FIG. 3 is a schematic diagram of a computing device that implements the platform in FIG. 1, in accordance with an embodiment.

FIG. 3 is a schematic diagram of another example computing device 300 that implements a system (e.g., platform 100 from FIG. 1) for providing access to secured content stored at a provisioning entity system 150, in accordance with an embodiment. As depicted, computing device 300 includes one or more processors 302, memory 304, one or more I/O interfaces 306, and, optionally, one or more network interfaces 308.

Each processor 302 may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

Memory 304 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 304 may store code executable at processor 302, which causes platform 100 to function in manners disclosed herein. Memory 304 includes a data storage. In some embodiments, the data storage includes a secure datastore. In some embodiments, the data storage stores received data sets, such as textual data, image data, or other types of data.

Each I/O interface 306 enables computing device 300 to interconnect with one or more input devices, such as a keyboard, mouse, camera, touch screen and a microphone, or with one or more output devices such as a display screen and a speaker.

Each network interface 308 enables computing device 300 to communicate with other components, to exchange data with other components, to access and connect to network resources, to serve applications, and perform other computing applications by connecting to a network such as network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

The methods disclosed herein may be implemented using a system that includes multiple computing devices 300. The computing devices 300 may be the same or different types of devices.

Each computing devices may be connected in various ways including directly coupled, indirectly coupled via a network, and distributed over a wide geographic area and connected via a network (which may be referred to as "cloud computing").

For example, and without limitation, each computing device 300 may be a server, network appliance, set-top box, embedded device, computer expansion module, personal computer, laptop, personal data assistant, cellular telephone, smartphone device, UMPC tablets, video display terminal, gaming console, electronic reading device, and wireless hypermedia device or any other computing device capable of being configured to carry out the methods described herein.

Figure 4:
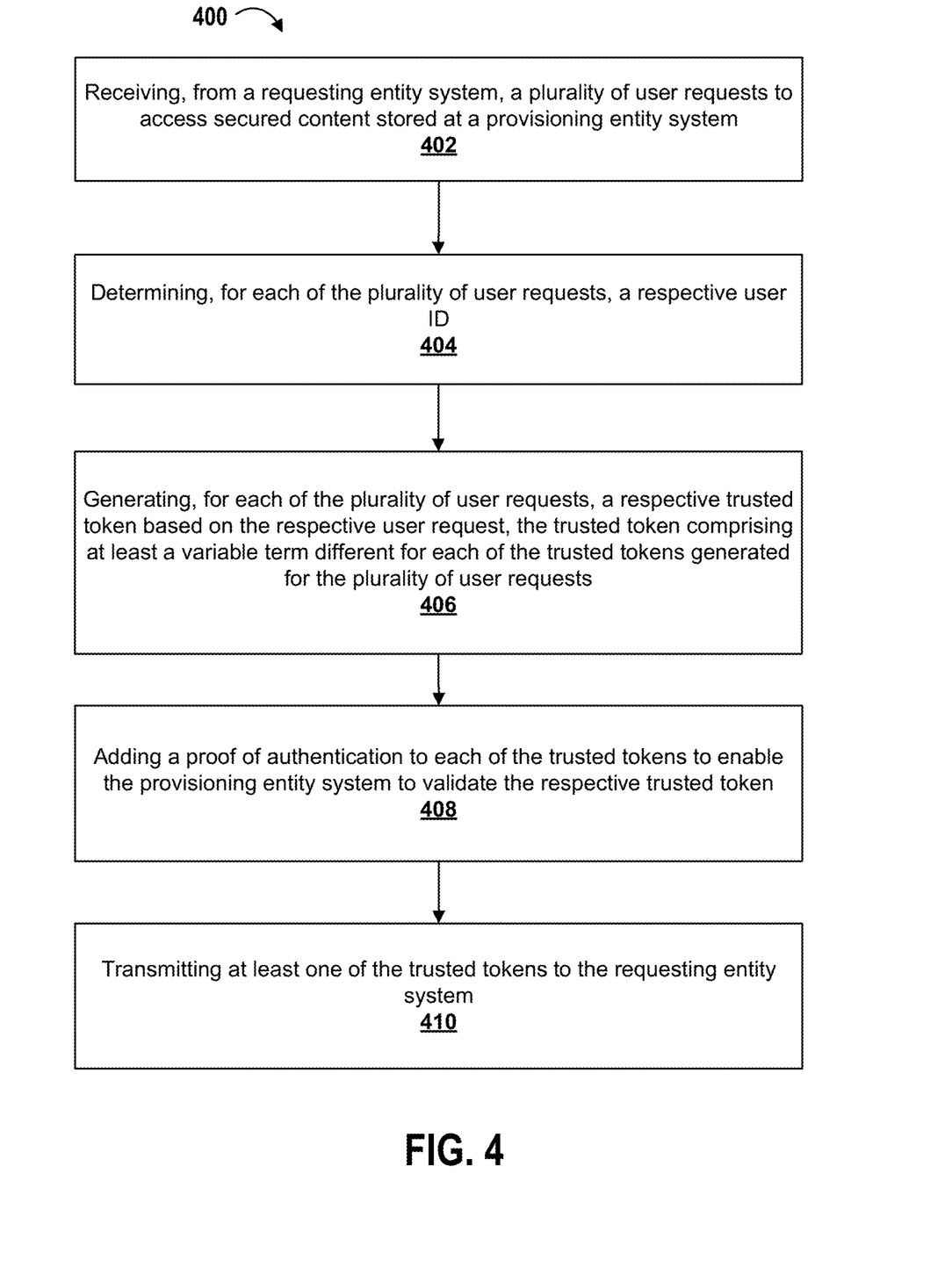
FIG. 4 shows an example process performed the platform in FIG. 1, in accordance with an embodiment.

FIG. 4 shows an example process performed by platform 100 in FIG. 1 (or the system 300 in FIG. 3), in accordance with an embodiment. At operation 402, platform 100 may receive, through a communication interface from a requesting entity system 130, a plurality of user requests to access secured content stored at a provisioning entity system 150. The plurality of user requests may be stored in database 122, for example.

At operation 404, platform 100 may determine, for each of the plurality of user requests, a respective user ID.

At operation 406, platform 100 may generate, for each of the plurality of user requests, a respective trusted token based on the respective user request, the trusted token comprising at least a variable term different for each of the trusted tokens generated for the plurality of user requests.

In some embodiments, the variable term may be uniquely generated for each trusted token.

In some embodiments, the variable term may be generated by encrypting the user ID from the respective user request associated with the trusted token.

In some embodiments, the method may include, prior to generating the respective trusted token, removing user identifying data from the respective user request.

In some embodiments, the user identifying data may include at least one of, a name, a phone number, a physical address, an e-mail address, a media access control (MAC) address, and an IP address.

In some embodiments, the respective trusted token may include data representing an expiry period of the respective trusted token.

In some embodiments, the respective token may include data representing a scope of the requested secured content stored at the provisioning entity system.

At operation 408, platform 100 may add a proof of authentication to each of the trusted tokens to enable the provisioning entity system to validate the respective trusted token.

In some embodiments, adding the proof of authentication to a respective trusted token may include adding a digital signature produced using a private key, and wherein the respective trusted token is verifiable using a public key corresponding to the private key.

At operation 410, platform 100 may transmit at least one of the trusted tokens to the requesting entity system 130, which may send the trusted token to the provisioning entity system 150. The provisioning entity system 150 may verify that the trusted token(s) are issued by platform 100 using the public key corresponding to the private key used to add the digital signature to the trusted token. Once verified, the provisioning entity system 150 may process the trusted token to determine a domain identifier associated with the requesting entity system 130, and allow access of the requested content by the user of the requesting entity system 130. This access may be logged by the provisioning entity system 150 for future auditing purposes.

Operations 404, 406 408 may be performed for each user request in the plurality of user requests received from the requesting entity system 130.

In some embodiments, platform 100 may be further configured to perform: receiving an auditing request including a plurality of user IDs from the requesting entity system; obtaining a plurality of validated trusted tokens used to access one or more secured content at the provisioning entity system; determining, based on the plurality of validated trusted tokens, one or more user IDs from the plurality of user IDs, the one or more user IDs used to access the one or more secured content at the provisioning entity system; and transmitting the one or more user IDs to the requesting entity system in response to the auditing request.

In some embodiments, the auditing request may include a given time period, and the plurality of trusted tokens are used to access the one or more secured content at the provisioning entity system during the given time period.

In some embodiments, determining the one or more user IDs may include: decrypting the plurality of validated trusted tokens to obtain, for each of the plurality of validated trusted tokens, an intermediary term comprising a respective user ID from the one or more user IDs and a respective variable term; and parsing each intermediary term to obtain the respective user ID.

In some embodiments, parsing each intermediary term may include decrypting the respective variable term to obtain the respective user ID.

Embodiments performing the operations for anomaly detection and anomaly scoring provide certain advantages over manually assessing anomalies. For example, in some embodiments, all data points are assessed, which eliminates subjectivity involved in judgement-based sampling, and may provide more statistically significant results than random sampling. Further, the outputs produced by embodiments of system are reproducible and explainable.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the disclosure, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The disclosure provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The embodiments and examples described herein are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

The invention claimed is:

1. A computer-implemented method for providing access to secured content on a provisioning entity system for a user of a requesting entity system, comprising:
    obtaining, from the requesting entity system, a request to access the secured content stored at the provisioning entity system, the request comprising user identifying data associated with the user;
    determining, from at least a first portion of the request, a user ID associated with the user, the user ID indicative of an identity of the user known to the requesting entity system and unknown to the provisioning entity system;
    generating, using the request, a trusted token for use in accessing the secured content, comprising:
        generating a variable term based on the user ID, the variable term being different from a plurality of other variable terms generated for a plurality of other requests to access the secured content;
        incorporating the variable term in the trusted token;
        omitting at least a second portion of the request from the trusted token, the second portion of the request comprising the user identifying data; and
        incorporating a proof of authentication in the trusted token to enable the provisioning entity system to validate the trusted token; and
    transmitting the trusted token to the requesting entity system for use by the user in accessing the secured content.

2. The method of claim 1, wherein the variable term is uniquely generated for each request issued by the requesting entity system.

3. The method of claim 1, wherein generating the variable term based on the user ID comprises encrypting the user ID.

4. The method of claim 1, wherein generating the variable term based on the user ID comprises:
    combining the user ID and an additional term to produce an intermediary term; and
    encrypting at least part of the intermediary term.

5. The method of claim 1, wherein the user ID is obtained from the request and forms part of the user identifying data.

6. The method of claim 1, wherein the user identifying data comprises at least one of: a name, a phone number, a physical address, an e-mail address, a media access control (MAC) address, and an IP address associated with the user.

7. The method of claim 1, wherein the trusted token comprises data representing an expiry period of the trusted token.

8. The method of claim 1, wherein the trusted token comprises an indication of a scope of the secured content identified in the request.

9. The method of claim 1, wherein incorporating the proof of authentication in the trusted token comprises incorporating a digital signature produced by a platform trusted by the provisioning entity system.

10. The method of claim 9, wherein the platform trusted by the provisioning entity generates the trusted token.

11. The method of claim 1, further comprising, subsequent to the secured content being accessed by the user using the trusted token:
    receiving an auditing request comprising at least one user ID from the requesting entity system;
    obtaining at least one validated trusted token used to access the secured content at the provisioning entity system;
    identifying, based on the at least one validated trusted token, one or more accessing user IDs from the at least one user ID, the one or more accessing user IDs associated with one or more respective validated trusted tokens used to access the secured content at the provisioning entity system; and
    transmitting the one or more accessing user IDs to the requesting entity system in response to the auditing request.

12. The method of claim 11, wherein the auditing request identifies a given time period, and wherein identifying the one or more accessing user IDs comprises identifying validated trusted token used to access the secured content at the provisioning entity system during the given time period.

13. The method of claim 11, wherein identifying the one or more accessing user IDs comprises decrypting the at least one validated trusted token to obtain, for each of the at least one validated trusted token, a respective user ID from the one or more user IDs.

14. The method of claim 13, comprising, for each of the at least one validated trusted tokens, parsing a respective intermediary term obtained from the decrypting to obtain the respective user ID.

15. A computer-implemented system for providing access to secured content on a provisioning entity system for a user of a requesting entity system, the system comprising:
   a communication interface;
   at least one processor;
   data storage in communication with said at least one processor, the data storage comprising a memory and a database; and
   instructions stored in said memory, which when executed at said at least one processor causes said system to perform:
      obtaining, from the requesting entity system, a request to access the secured content stored at the provisioning entity system, the request comprising user identifying data associated with the user;
      determining, from at least a first portion of the request, a user ID associated with the user, the user ID indicative of an identity of the user known to the requesting entity system and unknown to the provisioning entity system;
      generating, using the request, a trusted token for use in accessing the secured content, comprising:
         generating a variable term based on the user ID, the variable term being different from a plurality of other variable terms generated for a plurality of other requests to access the secured content;
         incorporating the variable term in the trusted token;
         omitting at least a second portion of the request from the trusted token, the second portion of the request comprising the user identifying data present in the request; and
         incorporating a proof of authentication in the trusted token to enable the provisioning entity system to validate the trusted token; and
      transmitting the trusted token to the requesting entity system for use by the user in accessing the secured content.

16. The system of claim 15, wherein generating the variable term based on the user ID comprises encrypting the user ID.

17. The system of claim 15, wherein the user ID is obtained from the request and forms part of the user identifying data.

18. The system of claim 15, wherein incorporating the proof of authentication in the trusted token comprises incorporating a digital signature produced by a platform trusted by the provisioning entity system.

19. The system of claim 15, wherein the instructions when executed at said at least one processor, further cause said system to perform, subsequent to the secured content being accessed by the user using the trusted token:
   obtaining an auditing request comprising at least one user ID from the requesting entity system;
   obtaining at least one validated trusted token used to access the secured content at the provisioning entity system;
   identifying, based on the at least one validated trusted token, one or more accessing user IDs from the at least one user ID, the one or more accessing user IDs associated with one or more respective validated trusted tokens used to access the secured content at the provisioning entity system; and
   transmitting the one or more accessing user IDs to the requesting entity system in response to the auditing request.

20. The system of claim 19, wherein the auditing request identifies a given time period, and wherein identifying the one or more accessing user IDs comprises identifying validated trusted token used to access the secured content at the provisioning entity system during the given time period.

21. The system of claim 19, wherein identifying the one or more accessing user IDs comprises decrypting the at least one validated trusted token to obtain, for each of the at least one validated trusted token, a respective user ID from the one or more user IDs.

22. A non-transitory computer-readable storage medium storing instructions which, when executed, cause at least one computing device to perform:
   obtaining, from the requesting entity system, a request to access the secured content stored at the provisioning entity system, the request comprising user identifying data associated with the user;
   determining, from at least a first portion of the request, a user ID associated with the user, the user ID indicative of an identity of the user known to the requesting entity system and unknown to the provisioning entity system;
   generating, using the request, a trusted token for use in accessing the secured content, comprising:
      generating a variable term based on the user ID, the variable term being different from a plurality of other variable terms generated for a plurality of other requests to access the secured content;
      incorporating the variable term in the trusted token;
      omitting at least a second portion of the request from the trusted token, the second portion of the request comprising the user identifying data present in the request; and
      incorporating a proof of authentication in the trusted token to enable the provisioning entity system to validate the trusted token; and
   transmitting the trusted token to the requesting entity system for use by the user in accessing the secured content.

23. The method of claim 1, further comprising storing the trusted token, the user ID, and at least part of the user identifying data omitted from the trusted token in a database to construct an audit record.

24. The method of claim 23, further comprising, subsequent to the secured content being accessed by the user using the trusted token:
   receiving an auditing request from the requesting entity system;
   determining, based on the audit record, one or more user IDs used to request access to the secured content at the provisioning entity during a given time period; and
   transmitting the one or more user IDs to the requesting entity system in response to the auditing request.

25. The system of claim 15, wherein the instructions when executed at said at least one processor, further cause said system to perform:

storing the trusted token, the user ID, and at least part of the user identifying data omitted from the trusted token in the database to construct an audit record.

26. The system of claim 25, wherein the instructions when executed at said at least one processor, further cause said system to perform, subsequent to the secured content being accessed by the user using the trusted token:
receiving an auditing request from the requesting entity system;
determining, based on the audit record, one or more user IDs used to request access to the secured content at the provisioning entity during a given time period; and
transmitting the one or more user IDs to the requesting entity system in response to the auditing request.

* * * * *